(No Model.)
S. S. UTTER.
STOVE.
No. 416,279. Patented Dec. 3, 1889.
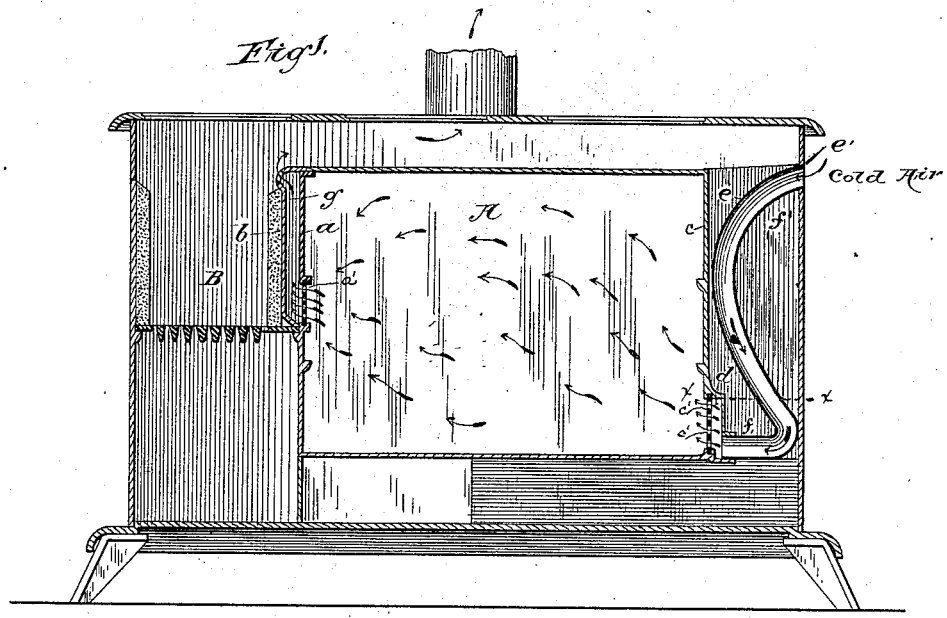
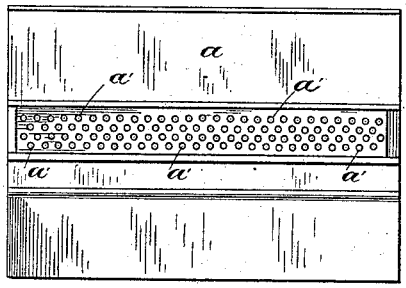
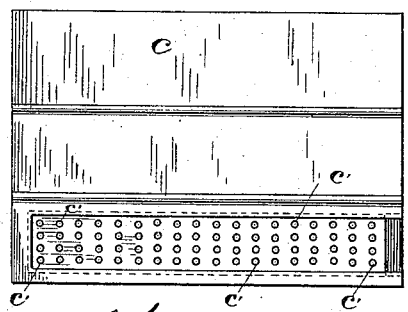
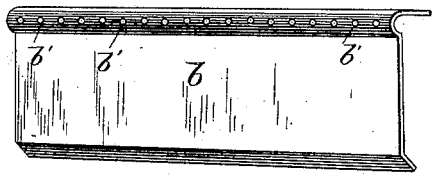
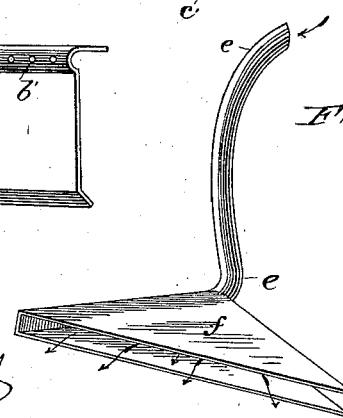
WITNESSES:
INVENTOR
Samuel S. Utter
BY Augustus T. Gurlitz
ATTORNEY

UNITED STATES PATENT OFFICE.

SAMUEL S. UTTER, OF BROOKLYN, NEW YORK.

STOVE.

SPECIFICATION forming part of Letters Patent No. 416,279, dated December 3, 1889.

Application filed March 22, 1889. Serial No. 304,344. (No model.)

*To all whom it may concern:*

Be it known that I, SAMUEL S. UTTER, a citizen of the United States, residing in the city of Brooklyn, county of Kings, and State of New York, have invented certain new and useful Improvements in Stoves; and I do hereby declare that the following is a full, clear, and exact description thereof, which will enable others skilled in the art to make and use the same, reference being had to the accompanying drawings, which form a part of this specification.

This invention consists of an improvement in the oven or baking-chamber of stoves, by means of which the articles therein are baked more evenly than in stoves as heretofore constructed, and the vapors of the baking food are also carried off through the smoke-flue of the stove.

In the drawings, Figure 1 represents a longitudinal vertical section of a stove containing my invention. Fig. 2 is a view of the front oven-plate. Fig. 3 is a view of the back fire-chamber plate. Fig. 4 is a view of the back oven-plate. Fig. 5 is a view of the air-supply channel of the oven. Fig. 6 is a section of the flue-strip $f'$ on the line $x$ $x$, to show one way of forming the air-channel $e$.

Similar letters of reference indicate like parts in all the drawings.

A is the oven or baking-chamber of the stove, and B is the fire-chamber. The back of the fire-chamber is provided with a plate $b$, Fig. 3, which at its upper front is perforated with a series of openings $b'$ $b'$ to permit discharge through them directly over the fire-chamber B. At a little distance back of this plate $b$ is situated the front oven-plate $a$, Fig. 1. Between the front oven-plate $a$ and the back fire-chamber plate $b$ a chamber $g$ is formed, which is heated by the fire in the fire-chamber B, and naturally discharges its contents of heated air upward through the openings $b'$ $b'$ in the plate $b$. The oven-plate $a$ is provided with a series of perforations $a'$ $a'$, which form a channel between the chamber $g$ and the oven A. The oven is further provided with a back oven-plate $c$, Fig. 4, which contains a series of perforations $c'$ $c'$, and back of the same a chamber $d$ is formed, into which the outer air is admitted through a suitable channel $e$, opening outward from the stove. This chamber $d$ is a very important feature of the invention, as thereby the outer air is received near the bottom of the baking-chamber or oven of the stove, and from thence it is drawn through the various perforations $c'$ $c'$ and distributed evenly through the baking-chamber or oven A. This air-chamber $d$ may be formed in any convenient manner, and extends from side to side of the oven A in order that the air from it may be drawn and distributed evenly through the oven, which is accomplished by means of the portion of the back plate $c$ having the perforations $c'$ $c'$ $c'$. These perforations serve to prevent the ingress of the outer air into the oven at only one or two points, and cause the same to enter the oven evenly from all parts.

One of the difficulties heretofore experienced in stoves designed for baking has been that the air has entered the baking-chamber directly from only one or two points, and the articles baked have been streaked, or baked or cooked more at some portions of their surface than at others, corresponding to the draft of the air passing over them. This I have found by experiment is obviated by the air-chamber $d$.

To supply the outer air to the oven in a heated state, one or more pipes or tubes $e$ are provided, which open at a point, as $e'$, outwardly from the stove, to receive the cold air. This tube $e$ is arranged in the smoke-channels, between the oven and the outer case of the stove, and becomes heated while the baking is going on, so that the air moving through it becomes considerably heated before it enters the air-chamber $d$, where it is still further heated and distributed and discharged into the oven A through the numerous perforations $c'$ $c'$ of the air-chamber $d$. It will be noted that in this structure the air-chamber $g$, which communicates with the oven A by means of the perforations $a'$ $a'$, and withdraws the atmospheric contents of the oven, communicates with the upper part of the fire-chamber B by means of the perforations $b'$ $b'$, and as this air-chamber $g$ is thus heated to a high degree and discharges its contents directly into the fire-chamber a powerful draft is created through the oven, which can only be supplied through the perforations $c'$ $c'$ of the air-chamber $d$. By this arrangement the draft is sufficient to assure a constant supply of pure air to the oven and its equal distribution through the oven, and by means of it also the odor of the contents of the oven is carried into the fire-chamber and thence into the flue, so that it does not escape into the room. A convenient way to form the air-supply channel is to cast about one-half of the same in the flue-strip $f'$ and make a corresponding casting $g'$, as shown in Fig. 6, to fit against the same, and secure these together in any suitable manner; but one or more suitable tubes may be employed instead, if desired, without departing from my invention. The lower portion of the pipe or tube $e$ may terminate in a wide-mouthed opening $f$, Fig. 5, of suitable size, discharging into the chamber $d$. As before stated, one or more of such pipes or tubes $e$ may be employed, and the mouth $f$ in them will be of suitable size, depending upon the number of pipes $e$. If only one is employed, the mouth $f$ may extend entirely across the plate $c$.

The manner of operation is as follows: When the fire-chamber is heated, the air in the chamber $g$ passes upward through the perforations $b'\ b'$ of the plate $b$, drawing the air out of the oven A through the perforations $a'\ a'$ of the plate $a$. To supply the air thus withdrawn, a current sets in from the opening $e'$ through the tube $e$, and the air there drawn in enters the chamber $d$ and impinges against the portion of the plate $c$ having the perforations $c'\ c'$, through which it is drawn into and by means of which it is evenly distributed through the oven A, passing through the perforations $a'\ a'$, chamber $g$, and perforations $b'\ b'$ into the smoke-channels, whence it is carried off through the flue, and with it the vapors arising in the process of cooking.

I do not claim, broadly, a stove provided with an oven, and means to admit air from without the stove into such oven; and I am also aware that it has been proposed to construct a stove in which air is to be taken from the vicinity of the fire-chamber, carried over and down to the lower part of the back of the oven, then through the oven to one or more inlets at the lower part of the front of the oven, and thence to the ash-chamber, as shown in Letters Patent No. 89,903, and I do not claim any such structure; but,

Having thus described my invention, what I claim as new, and desire to secure by Letters Patent, is—

1. A stove containing an oven and a fire-chamber and provided with suitable communication between the same adapted to discharge the atmospheric contents of the oven into the fire-chamber at or near its highest point, in combination with an air-chamber $d$, disposed upon the lower side of the oven farthest from the fire-chamber, such chamber $d$ extending substantially across the entire width of the oven and provided with a suitable channel to receive air from without the stove, and with numerous perforated openings $c'\ c'$, adapted to distribute the air from the chamber $d$ equally throughout the oven in its passage to the fire-chamber, substantially as described and shown.

2. A stove provided with an oven, an air-chamber $d$, extending substantially across the entire width of the oven near its base and provided with a suitable air-supply tube $e$, and communicating with the oven only by means of small perforations $c'\ c'$, adapted to distribute the air therefrom equally throughout the oven in its passage to the fire-chamber, in combination with a fire-chamber B, disposed on the side of the stove farthest from the air-chamber $d$, an air-chamber $g$ between the oven and fire-chamber, and openings $a'\ a'\ b'\ b'$, adapted to carry the air from the oven into the fire-chamber at or near its highest point, substantially as described and shown.

SAMUEL S. UTTER.

Witnesses:
 CARWIN H. PIKE,
 JESSE S. EPSTEIN.